United States Patent

Lin

[19]

[11] Patent Number: 6,082,757

[45] Date of Patent: Jul. 4, 2000

[54] FOLDING COLLAPSIBLE FISHING CART

[76] Inventor: Yung-Hsing Lin, No. 8, Alley 30, Lane 371, Hwacheng Rd., Hsin Chuang City, Taipei Hsien, Taiwan

[21] Appl. No.: 09/190,262

[22] Filed: Nov. 12, 1998

[51] Int. Cl.⁷ ..................................................... B62B 1/12
[52] U.S. Cl. ........................... 280/654; 280/655; 280/659; 280/47.26; 280/47.33; 280/47.315; 280/47.18; 403/92; 16/429
[58] Field of Search .............................. 280/638, 35, 639, 280/651, 652, 654, 655, 43.1, 43.14, 47.131, 47.18, 47.19, 47.24, 47.26, 47.315, 47.34, 47.36, 47.35, 47.371, 63, 79.3; 16/429, 405, 113.1; 403/102, 92, 109.3

[56] References Cited

U.S. PATENT DOCUMENTS

| D. 286,699 | 11/1986 | Thomas, Jr. | D34/26 |
|---|---|---|---|
| 3,804,432 | 4/1974 | Lehrman | 280/47.19 |
| 3,997,181 | 12/1976 | Jaco et al. | 280/47.19 |
| 4,355,818 | 10/1982 | Watts | 280/654 |
| 4,637,626 | 1/1987 | Foss et al. | 280/47.371 |
| 4,749,209 | 6/1988 | Edmonds | 280/652 |
| 4,784,405 | 11/1988 | Stein | 280/655 |
| 4,974,871 | 12/1990 | Mao | 280/47.371 |
| 5,203,815 | 4/1993 | Miller | 280/47.26 |
| 5,544,910 | 8/1996 | Esposito | 280/654 |
| 5,611,561 | 3/1997 | Dale, II | 280/652 |
| 5,626,352 | 5/1997 | Grace | 280/47.29 |
| 5,927,745 | 7/1999 | Cunningham | 280/652 |

*Primary Examiner*—Michael Mar
*Assistant Examiner*—Ruth Ilan
*Attorney, Agent, or Firm*—Dougherty & Troxell

[57] ABSTRACT

A fishing cart includes a base frame having two front foot members and two upright stop rods bilaterally disposed on the middle, a transverse wheel holder frame tube welded to a rear side of the base frame to hold a pair of wheels, a back frame pivoted to the rear side of the base frame by pivot means and set between an operative position and a collapsed position, the back frame having parallel barrels and receptacles for holding fishing rods, a U-shaped handle frame pivoted to the back frame by pivot means and turned up and down between an operative position and a collapsed position, two releasable retaining devices bilaterally mounted on the back frame for locking the handle frame in the operative position, a pull cable connected between the retaining devices for pulling by hand to disengage the retaining devices from the handle frame for permitting the handle frame to be collapsed, and a backpack carried on the base frame between the upright stop rods and the back frame, the backpack having hook and loop materials for securing to the back frame.

1 Claim, 10 Drawing Sheets

FOLDING COLLAPSIBLE FISHING CART

BACKGROUND OF THE INVENTION

The present invention relates to folding collapsible carts, and more specifically to a folding collapsible fishing cart designed for use in fishing for carrying fishing apparatus and accessories.

Fishing is an activity full of fun. Before going out for a sport fishing, one may have to carry a variety of fishing tackles and accessories, including fishing rods, fish hooks, artificial baits, sinkers, an icebox for keeping caught fishes in fresh, etc. It is difficult to carry all prepared fishing tackles and accessories.

SUMMARY OF THE INVENTION

The present invention has been accomplished under the circumstances in view. It is one object of the present invention to provide a fishing cart which is practical for carrying any of a variety of fishing tackles and accessories. It is another object of the present invention to provide a fishing cart which is folding collapsible. According to one aspect of the present invention, the folding collapsible fishing cart is comprised of a base frame having two front foot members and two upright stop rods bilaterally disposed on the middle, a transverse wheel holder frame tube welded to a rear side of the base frame to hold a pair of wheels, a back frame pivoted to the rear side of the base frame by pivot means and set between an operative position and a collapsed position, a U-shaped handle frame pivoted to the back frame by pivot means and turned up and down between an operative position and a collapsed position, two releasable retaining devices bilaterally mounted on the back frame for locking the handle frame in the operative position, a pull cable connected between the retaining devices for pulling by hand to disengage the retaining devices from the handle frame for permitting the handle frame to be collapsed, and a backpack carried on the base frame between the upright stop rods and the back frame, the backpack having hook and loop materials for securing to the back frame. According to another aspect of the present invention, the back frame comprises parallel barrels and parallel receptacles disposed at different elevations for holding fishing rods.

BRIEF DESCRIPTION OF THE DRAWINGS

FIG. 3-1 is an enlarged view of a part of the back frame for the folding collapsible fishing cart according to the present invention.

FIG. 3-2 is an exploded view of FIG. 3-1.

FIG. 3-3 is a sectional view in an enlarged scale of a part of the present invention, showing the handle frame locked in the operative position.

FIG. 8-1 is an exploded view in an enlarged scale of a part of the present invention, showing the connection between the base frame and the back frame.

FIG. 8-2 is an assembly view of FIG. 8-1.

DETAILED DESCRIPTION OF THE PREFERRED EMBODIMENT

Figure 1:
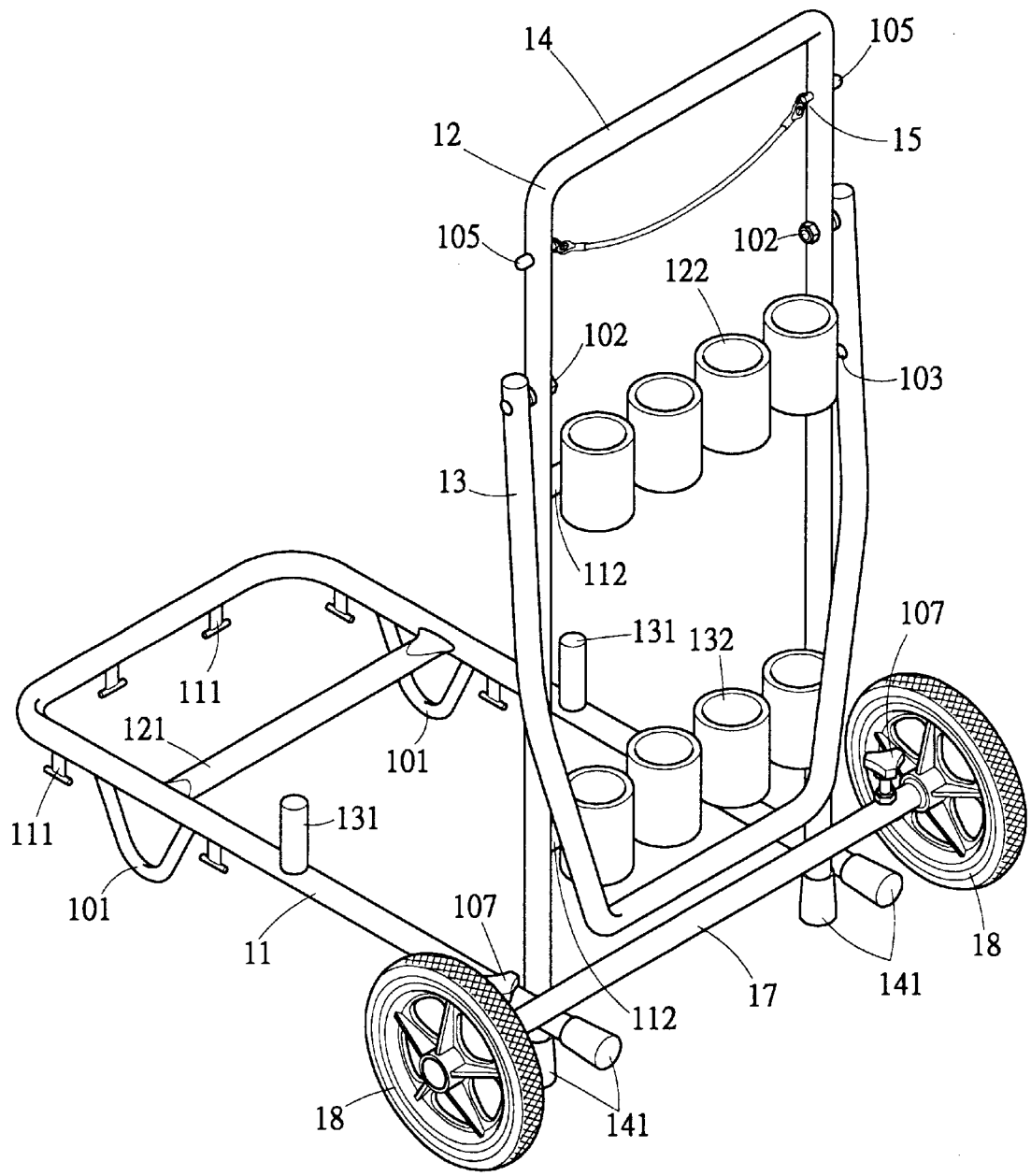
FIG. 1 is a perspective view of a folding collapsible fishing cart according to the present invention.
Figure 2:
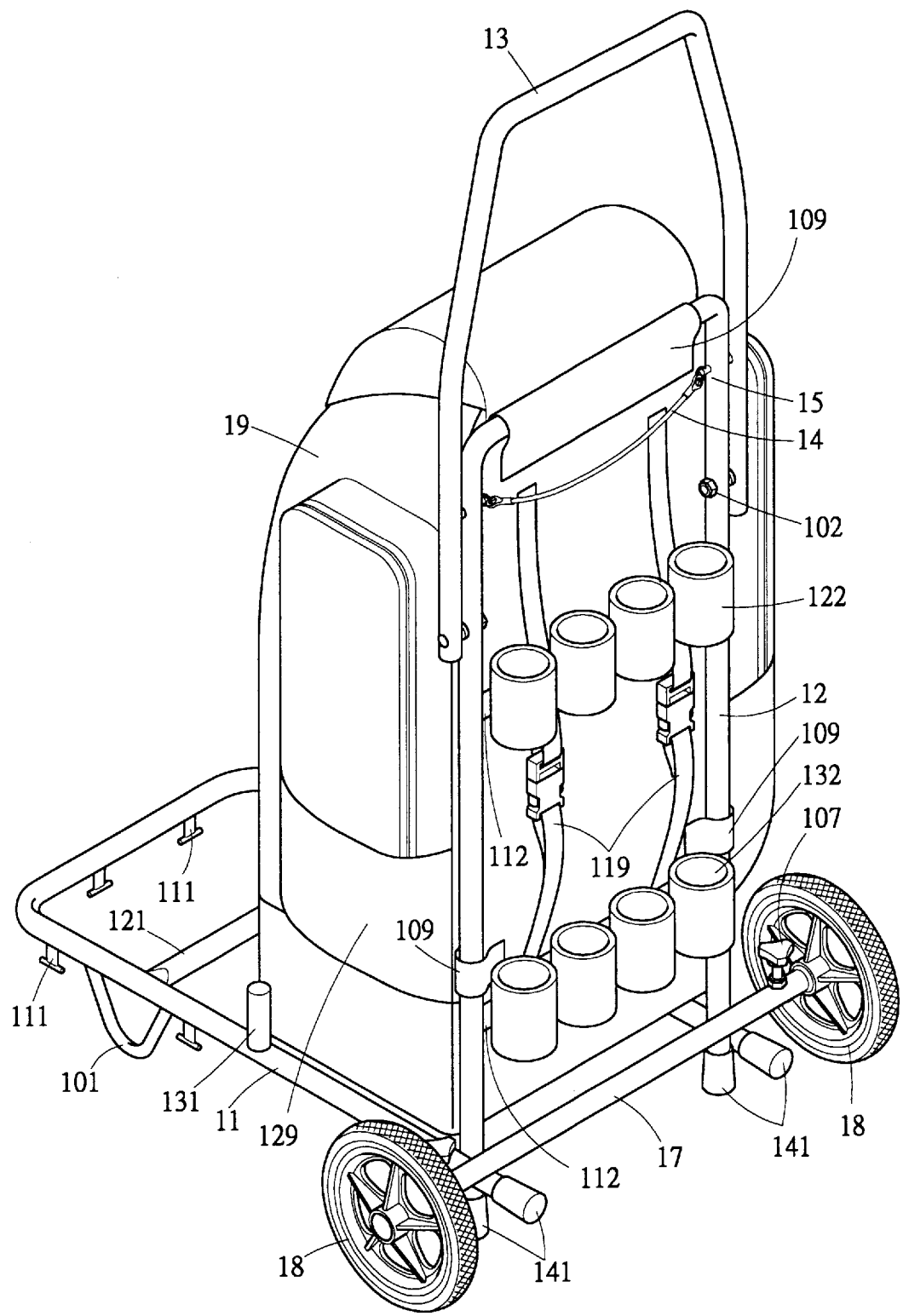
FIG. 2 is an applied view of the present invention, showing a backpack carried on the base frame of the folding collapsible fishing cart and secured to the back frame.
Figure 10:
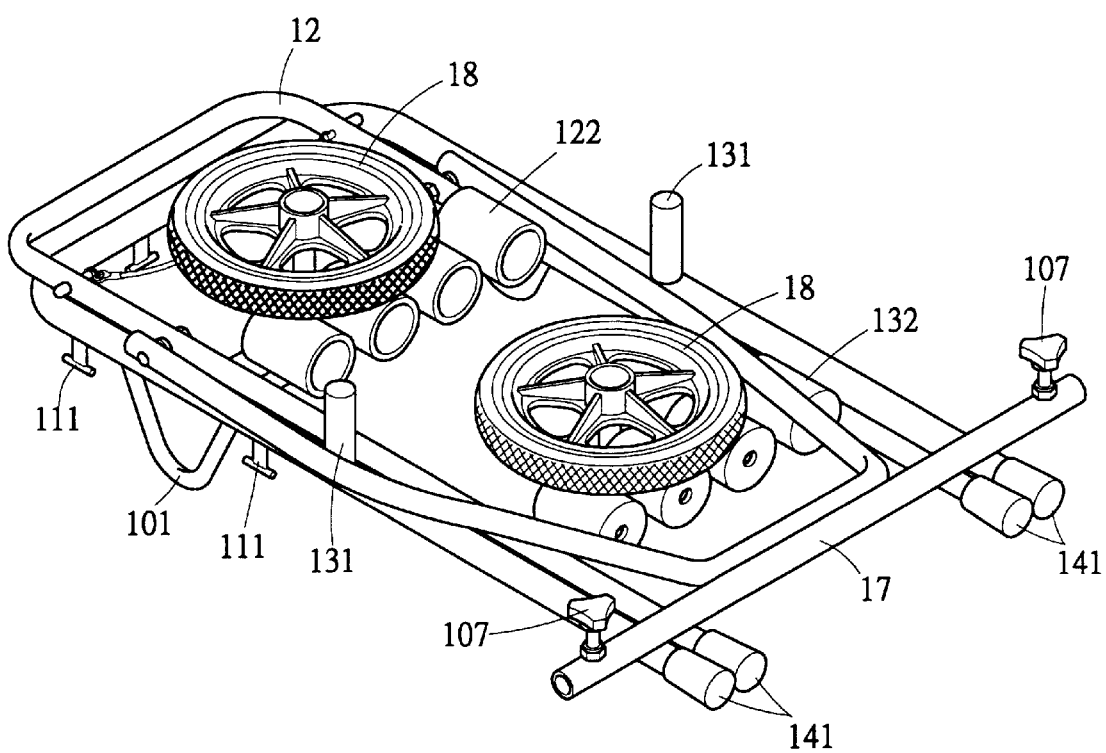
FIG. 10 shows the fishing cart collapsed according to the present invention.

Referring to FIGS. 1, 2 and 10, a folding collapsible fishing cart in accordance with the present invention is generally comprised of a substantially U-shaped base frame 11, a substantially U-shaped back frame 12 pivoted to the base frame 11 at a back side and set between the non-operative position (collapsed position) where the back frame 12 is closely attached to the base frame 11 (see also FIG. 10), and the operative position where the back frame 12 is retained perpendicular to the base frame 11 (see FIGS. 1 and 2), a substantially U-shaped handle frame 13 pivoted to the back frame 12 and set between the operative position shown in FIG. 2 and the non-operative (collapsed) position shown in FIG. 1, a transverse wheel holder frame tube 17 transversely welded to the base frame 11 at the back side, and two wheels 18 mounted on two opposite ends of the transverse wheel holder frame tube 17 to make the folding collapsible fishing cart easy to move.

Referring to FIG. 1 again, the substantially U-shaped base frame 11 comprises two foot members 101 bilaterally disposed near its front side (remote from the transverse wheel holder frame tube 17), a stretcher 121 transversely disposed above the foot members 101, a plurality of downward lugs 111, two upright stop rods 131 bilaterally disposed on the middle.

Figure 5:
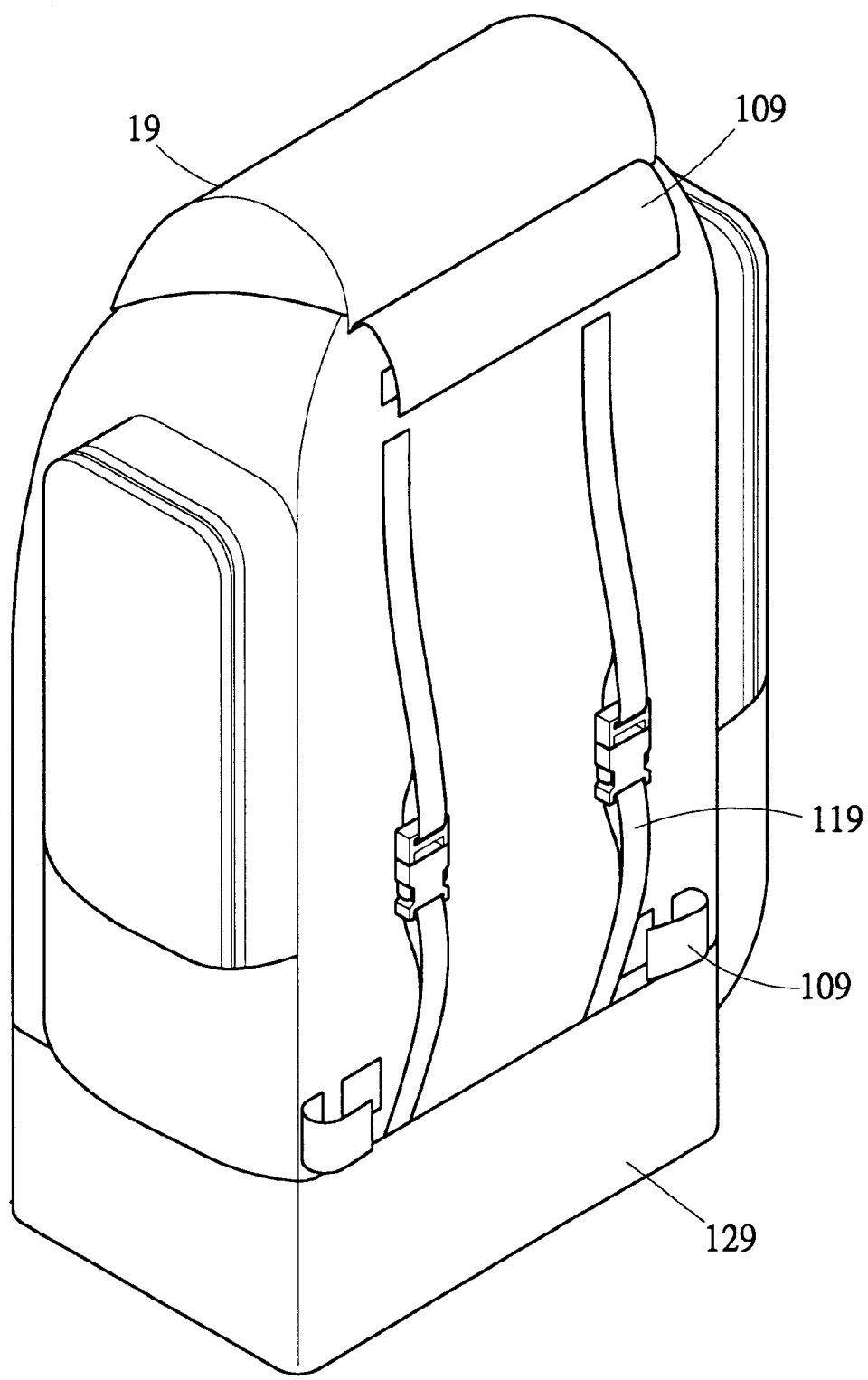
FIG. 5 is a perspective view of the backpack according to the present invention.
Figure 6:
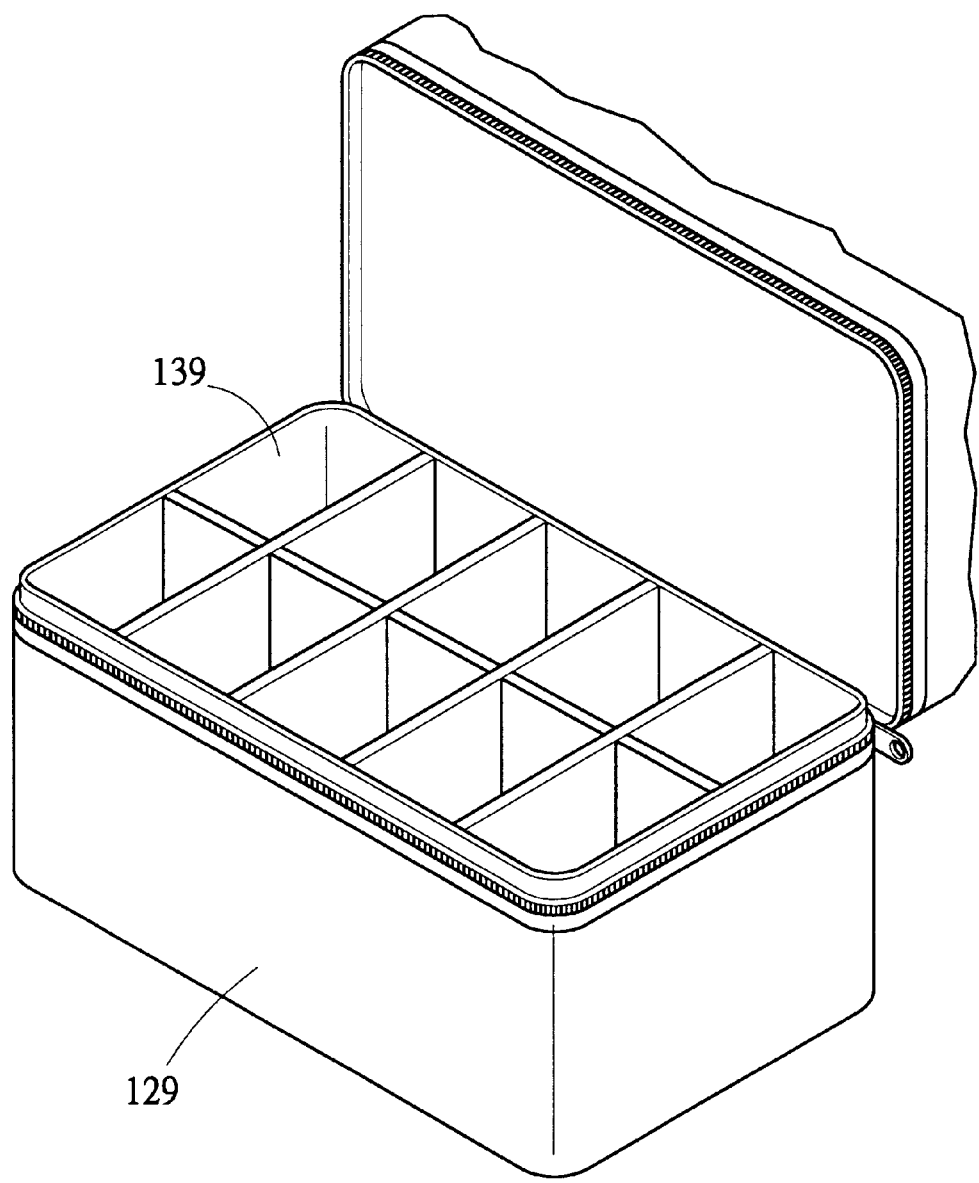
FIG. 6 shows the box of the backpack opened according to the present invention.

Referring to FIGS. 5 and 6 and FIG. 2 again, a backpack 19 may be carried on the base frame 11 and retained between the upright stop rods 131 and the back frame 12. The backpack 19 has adjustable shoulder straps 119 for carrying on the shoulders or the frame structure of a bicycle, hook and loop materials 109 for securing the backpack 19 to the back frame 12 (see FIG. 2), and a box 129 at its bottom side. The box 129 has a hinged cover panel integral with the bottom panel of the body of the backpack 19, and a plurality of compartments 139 for holding fishing accessories.

Figures 1, 8:
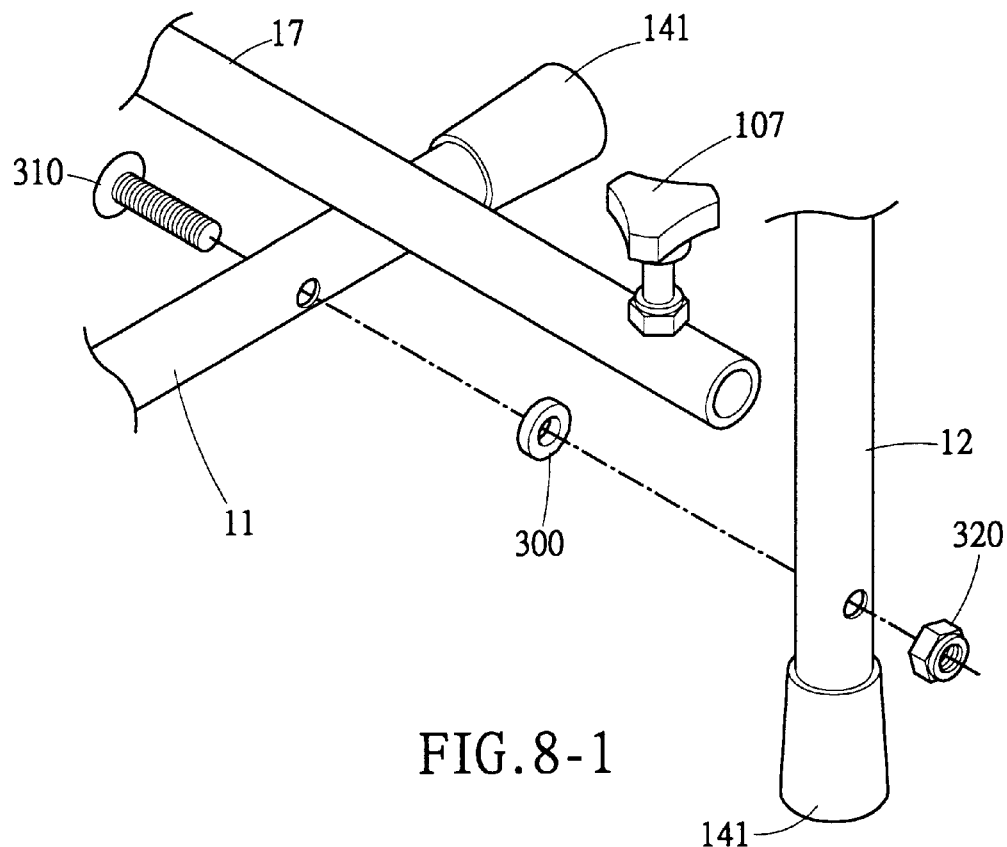
Figures 2, 8:
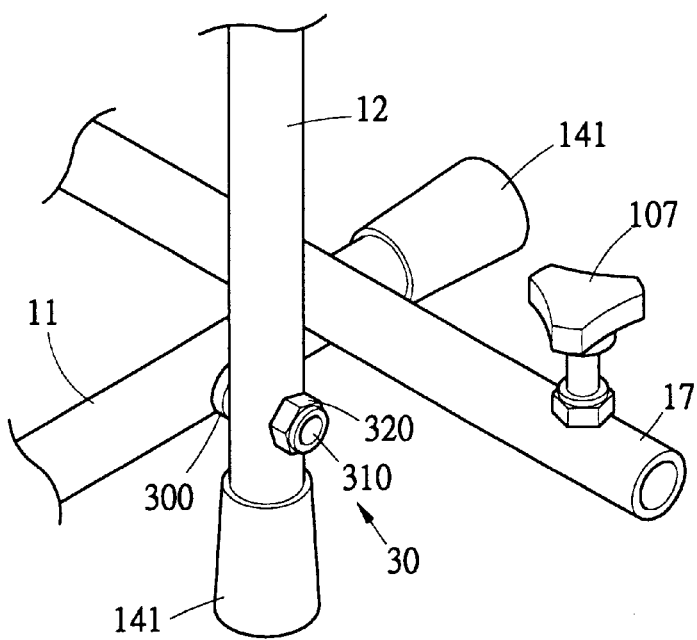

Referring to FIGS. 8-1 and 8-2 and FIGS. 1 and 10 again, the U-shaped back frame 12 has two parallel bottom ends respectively pivoted to the two parallel rear ends 151 of the U-shaped base frame 11 by a respective pivot means 30. Each pivot means 30 is comprised of a screw bolt 310, a nut 320 and a cushion 300. When the nuts 320 of the two pivot means 30 are loosened from the respective screw bolts 310, the back frame 12 is allowed to be turned about the screw bolts 310 between the non-operative (collapsed) position (see FIG. 10) and the operative position (see FIG. 2). Further, rubber end caps 141 are respectively fastened to the parallel bottom ends of the back frame 12 and the parallel rear ends 151 of the base frame 11.

Figures 1, 3:
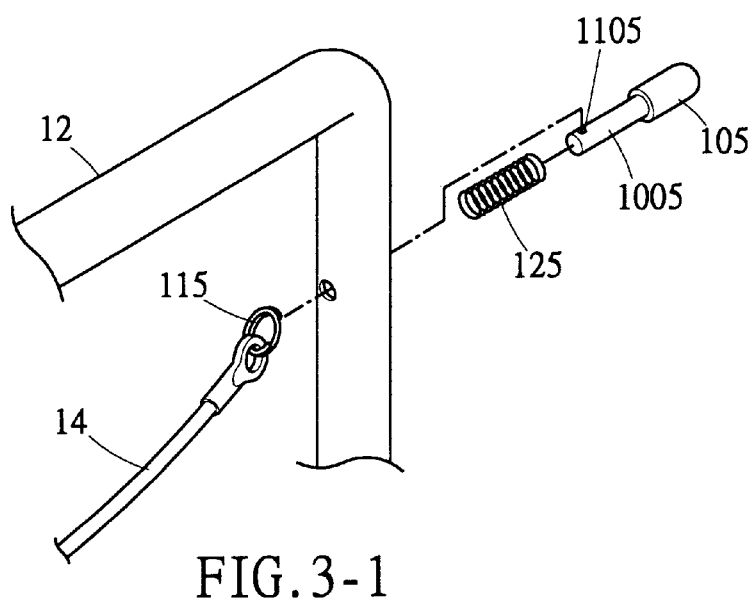
Figures 2, 3:
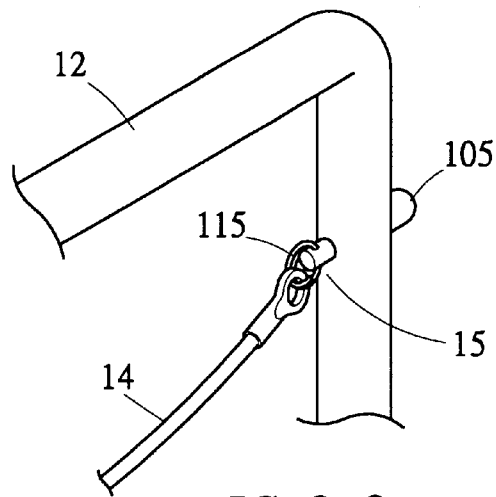
Figure 3:
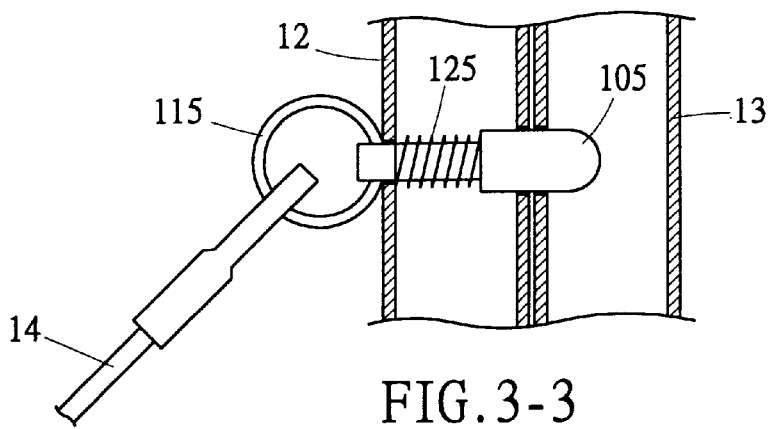
Figure 4:
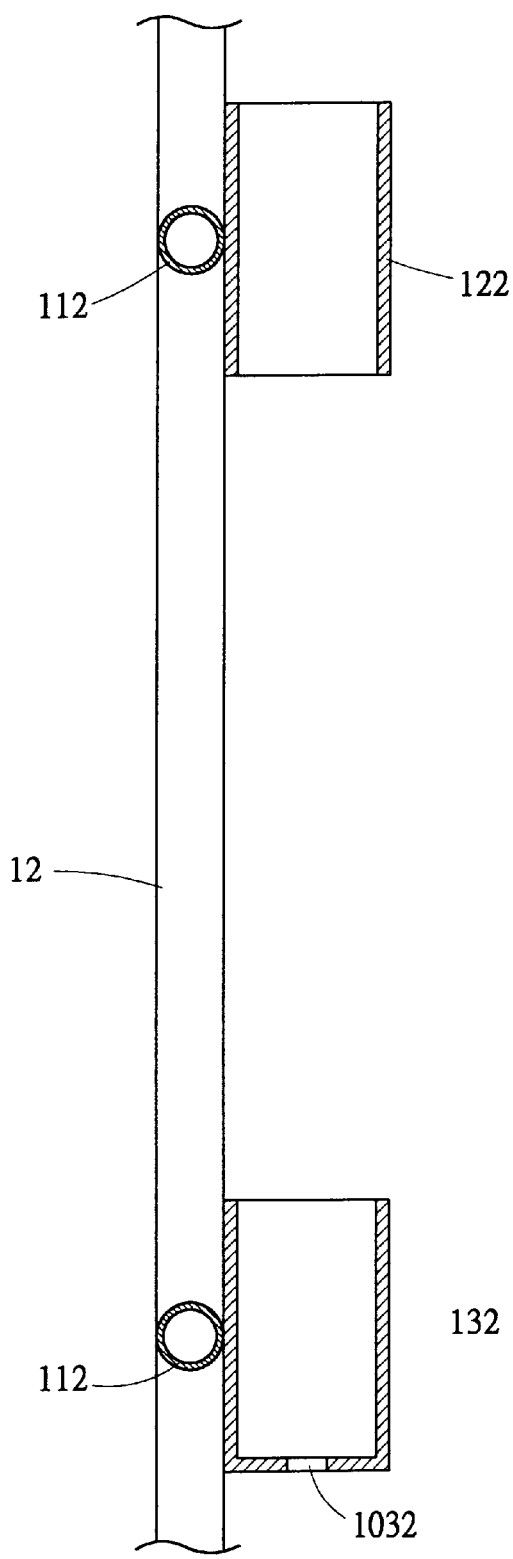
FIG. 4 is a side view in section in an enlarged scale of a part of the back frame according to the present invention.

Referring to FIGS. 3-1, 3-2, 3—3 and 4 and FIGS. 1 and 2 again, the back frame 12 comprises two transverse frame bars 112 disposed at different elevations, a plurality of barrels 122 respectively welded to one transverse frame bar 112 (the transverse frame bar at the higher elevation) and arranged in parallel, a plurality of receptacles 132 respectively welded to the other transverse frame bar 112 (the transverse frame bar at the lower elevation) and arranged in parallel corresponding to the barrels 122, two releasable retaining devices 15 bilaterally disposed near its closed top side for locking the handle frame 13 in the operative position, and a pull cable 14 connected between the releasable locks 15 and pulled to release the releasable retaining devices 15 from the handle frame 13. The receptacles 132 each have a bottom drain hole 1032 (see FIG. 4). The releasable retaining devices 15 each comprise a locking bolt 105 inserted through a respective transverse through hole at the back frame 12, the locking bolt 105 having a neck 1005 and a coupling hole 1105 at the neck 1005, a coupling ring 115 fastened to the coupling hole 1105 and coupled to one end of the pull cable 14, and a compression spring 125 mounted around the neck 1005 inside the back frame 12 and imparting an outward pressure to the locking bolt 105. The U-shaped handle frame 13 has two opposite ends bilaterally pivoted to the back frame 12 by pivot means 102, and two lock holes 103 respectively spaced from the pivot means 102 at a distance. When the handle frame 13 is turned upwards to the operative position shown in FIG. 2, the locking bolts 105 of the releasable retaining devices 15 are forced by the respective compression springs 125 into the lock holes 103 at the handle frame 13 (see FIG. 3—3), and therefore the handle frame 13 is locked in the operative position. When the pull cable 14 is pulled with the hand, the locking bolts 105 of the releasable retaining devices 15 are respectively disengaged from the lock holes 103, enabling the handle frame 13 to be turned downwards to the non-operative (collapsed) position shown in FIG. 10.

Figure 7:
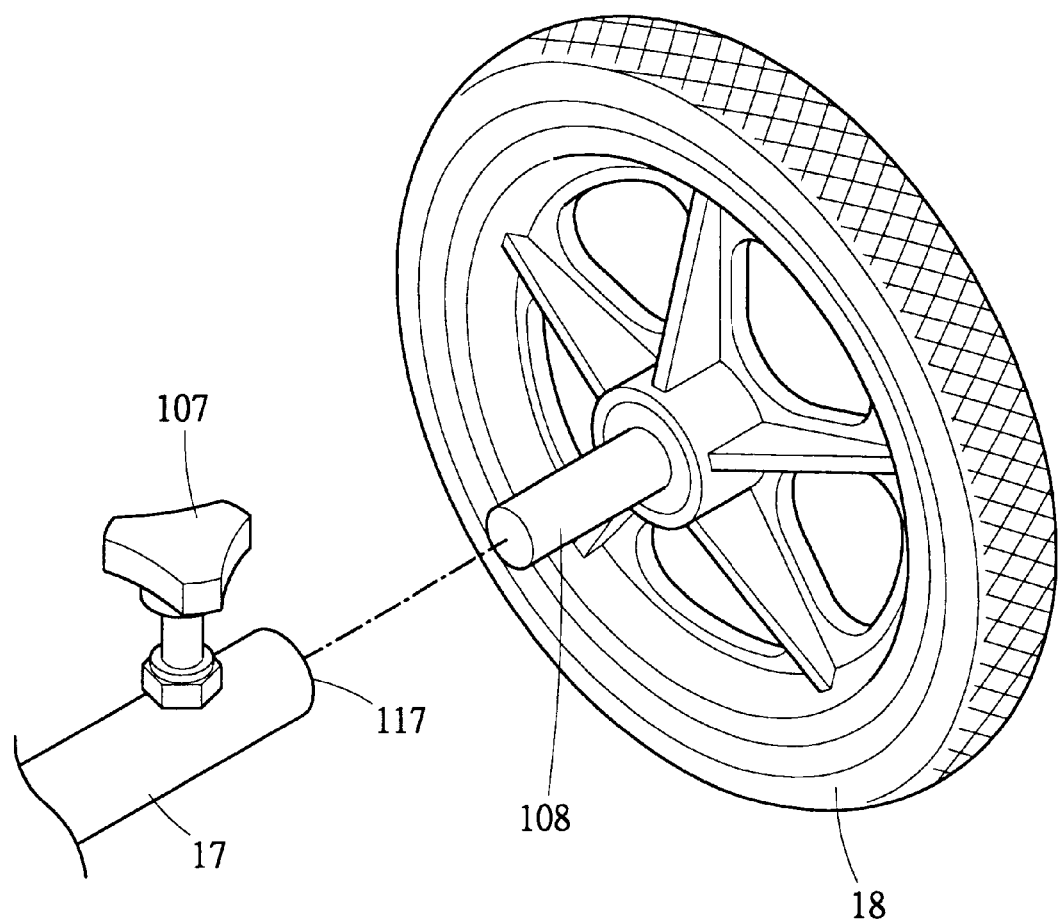
FIG. 7 is an exploded view in an enlarged scale of a part of the present invention, showing the connection between the wheel and the transverse wheel holder frame tube.

Referring to FIG. 7 and FIGS. 1 and 10 again, the wheels 18 each have a revolvable wheel shaft 108 respectively inserted into the ends 117 of the transverse wheel holder frame tube 17, and locked by a respective lock screw 107. When the lock screws 107 are loosened, the wheels 18 can then be removed from the transverse wheel holder frame tube 17.

Figure 9:
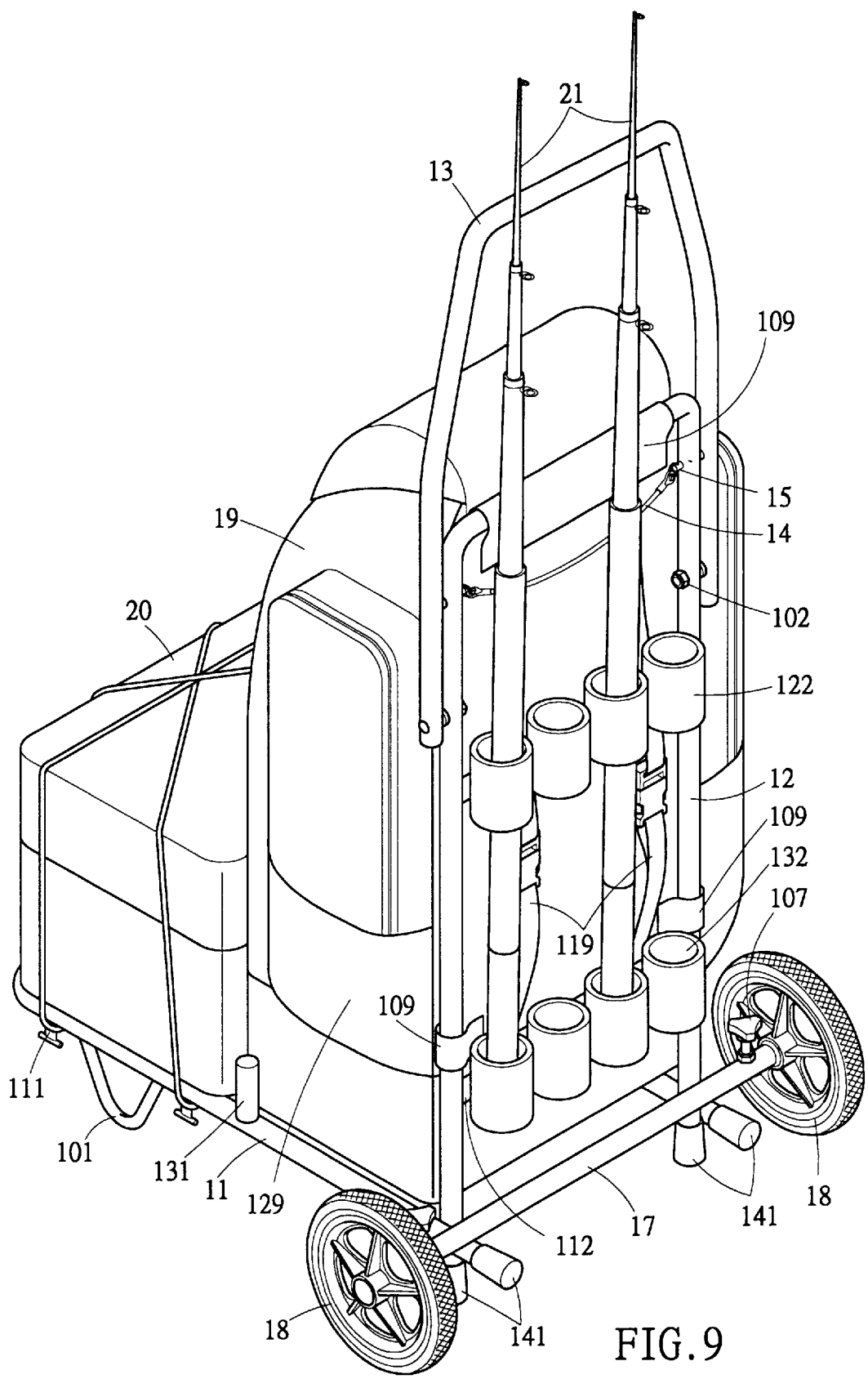
FIG. 9 is another applied view of the present invention, showing fishing rods carried on the receptacles at the back frame, the backpack and an icebox carried on the base frame.

Referring to FIG. 9, fishing rods 21 can be inserted through the barrels 122 and carried on the receptacles 132. Further, an elastic band or winding wire may be used and fastened to the downward lugs 111 to secure an icebox 20 to the base frame 11 in front of the backpack 19. When base frame 11 is disposed in a horizontal position, the fishing cart is stably supported on the ground by the wheels 18 and the foot members 101. When the fishing cart is tilted with its gravity weight supported on the wheels 18, it can then be conveniently moved on the ground.

While only one embodiment of the present invention has been shown and described, it will be understood that various modifications and changes could be made thereunto without departing from the spirit and scope of the invention disclosed.

What the invention claimed is:

1. A fishing cart comprising:

a base frame having a front side and a rear side, two upright stop rods bilaterally disposed on the middle of the base frame, two foot members bilaterally disposed near the front side, and a plurality of downward lugs around the front side;

a transverse wheel holder frame tube welded to the rear side of said base frame;

two wheels respectively mounted on two opposite ends of said transverse wheel holder frame tube;

a back frame pivoted to the rear side of said base frame by pivot means and set in either a first position where said back frame is closely attached to said base frame, or a second position where said back frame is retained perpendicular to said base frame, said back frame comprising an upper transverse frame bar and a lower transverse frame bar disposed at different elevations, a plurality of barrels respectively welded to said upper transverse frame bar and arranged in parallel, and a plurality of receptacles respectively welded to said lower transverse frame bar and arranged in parallel for holding fishing rods in said barrels;

a U-shaped handle frame pivoted to said back frame by pivot means and turned up and down between an operative position and a non-operative position, said U-shaped handle frame having two lock holes respectively disposed at two opposite sides;

two releasable retaining devices bilaterally mounted on said back frame for locking said handle frame in the operative position, said releasable retaining devices each comprising a locking bolt inserted through a respective transverse through hole at said back frame and respectively forced into engagement with the lock holes at said handle frame to lock said handle frame in the operative position, said locking bolt having a neck and a coupling hole at said neck, a coupling ring fastened to the coupling hole of said locking bolt and stopped outside said back frame, and a compression spring mounted around the neck of said locking bolt inside said back frame and imparting an outward pressure to said locking bolt;

a pull cable connected between the coupling rings of said retaining devices for pulling by hand to disengage the locking bolts of said retaining devices from the lock holes of said handle frame; and a backpack carried on said base frame between said upright stop rods and said back frame, said backpack having hook and loop materials for securing to said back frame.

\* \* \* \* \*